(12) United States Patent
Hodgson et al.

(10) Patent No.: US 11,220,197 B2
(45) Date of Patent: Jan. 11, 2022

(54) VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Rick Alan Anderson, Grand Haven, MI (US); Andrew K. Ruiter, Grand Haven, MI (US)

(73) Assignee: SHANGHAI YANFENG JINQIAO AUTOMOTIVE TRIM SYSTEMS CO. LTD., Novi, MI (US)

( * ) Notice: Subject to any disclaimer, the term of this patent is extended or adjusted under 35 U.S.C. 154(b) by 245 days.

(21) Appl. No.: 16/700,488

(22) Filed: Dec. 2, 2019

(65) Prior Publication Data

US 2020/0101881 A1 Apr. 2, 2020

Related U.S. Application Data

(63) Continuation of application No. PCT/US2019/047238, filed on Aug. 20, 2019.
(Continued)

(51) Int. Cl.
*B60N 2/75* (2018.01)
*B60R 7/04* (2006.01)
*E05F 1/12* (2006.01)

(52) U.S. Cl.
CPC .............. *B60N 2/793* (2018.02); *B60R 7/04* (2013.01); *E05F 1/1253* (2013.01)

(58) Field of Classification Search
CPC .......... B60N 2/793; B60R 7/04; E05F 1/1253
(Continued)

(56) References Cited

U.S. PATENT DOCUMENTS 6,616,205 B2 9/2003 Bruhnke et al.
7,064,285 B2 6/2006 Ichimaru
(Continued)

FOREIGN PATENT DOCUMENTS

CN 204172791 U 2/2015
CN 204184264 U 3/2015
(Continued)

OTHER PUBLICATIONS

International Search Report and Written Opinion for International Application No. PCT/US2019/047238 dated Oct. 18, 2019, 8 pages.

*Primary Examiner* — D Glenn Dayoan
*Assistant Examiner* — E Turner Hicks
(74) *Attorney, Agent, or Firm* — Amin, Turocy & Watson, LLP

(57) ABSTRACT

A vehicle interior component is disclosed. The vehicle interior component may comprise a base providing a compartment, two covers moveable between closed and open positions and a link to couple and decouple movement of the covers. One of the covers may remain open as the other is closed. The link may comprise two arms; one arm may move relative to the other to enable relative movement of the covers. One arm may comprise a depression and the other may comprise a protrusion to engage the depression to couple movement of the arms. The link may comprise a spring to hold the protrusion with the depression to couple movement of the arms; the spring may compress to enable disengagement of the protrusion and depression to enable relative movement of the covers. The component may comprise at least one of a console, a center console, a floor console.

20 Claims, 9 Drawing Sheets

Related U.S. Application Data

(60) Provisional application No. 62/720,921, filed on Aug. 21, 2018.

(58) Field of Classification Search
USPC .................... 296/37.8, 24.34, 37.12
See application file for complete search history.

(56) References Cited

U.S. PATENT DOCUMENTS

| | | | | |
|---|---|---|---|---|
| 7,407,200 | B2 * | 8/2008 | Ichimaru | E05B 77/42 |
| | | | | 292/194 |
| 7,533,919 | B2 | 5/2009 | Sauer | |
| 8,740,265 | B2 * | 6/2014 | Gillis | E05B 77/42 |
| | | | | 292/214 |
| 9,868,401 | B2 * | 1/2018 | Kodama | B60R 7/04 |
| 10,040,397 | B1 * | 8/2018 | Wuerthele | B60N 2/793 |
| 10,077,592 | B1 * | 9/2018 | Thorsell | E05F 1/105 |
| 10,150,422 | B2 * | 12/2018 | Ramaer | B60R 7/04 |
| 10,697,212 | B2 * | 6/2020 | Suzuki | E05C 7/04 |
| 10,717,390 | B2 * | 7/2020 | Anderson | B60N 2/793 |
| 2005/0183940 | A1 | 8/2005 | Ichimaru | |
| 2010/0102061 | A1 * | 4/2010 | Hamaguchi | B60R 7/04 |
| | | | | 220/255 |
| 2010/0156128 | A1 * | 6/2010 | Dexter | B60N 3/102 |
| | | | | 296/24.34 |
| 2010/0244478 | A1 * | 9/2010 | DePue | B60N 2/773 |
| | | | | 296/24.43 |
| 2017/0232902 | A1 * | 8/2017 | Keller | B60N 2/75 |
| | | | | 296/24.34 |

FOREIGN PATENT DOCUMENTS

| | | |
|---|---|---|
| CN | 105818754 A1 | 8/2016 |
| CN | 105835733 A | 8/2016 |
| DE | 10 2009 036453 A1 | 4/2010 |
| DE | 10 2009 036454 A1 | 4/2010 |
| DE | 10 2011 079653 A1 | 1/2013 |
| DE | 10 2010 039821 B4 | 5/2014 |
| DE | 20 2010 018274 U1 | 4/2015 |
| DE | 10 2015 105977 B3 | 5/2016 |
| DE | 102016006138 | 12/2016 |
| DE | 10 2016 014388 A1 | 6/2017 |
| DE | 202017106909 | 11/2017 |
| DE | 10 2010 039821 C5 | 3/2018 |
| DE | 102017100055 A1 | 7/2018 |
| JP | 3987969 B2 | 10/2007 |
| JP | 4218225 B2 | 2/2009 |
| JP | 4384078 B2 | 12/2009 |
| JP | 2010-163031 A | 7/2010 |
| JP | 4619037 B2 | 1/2011 |
| KR | 19980046544 A | 9/1998 |
| KR | 100738305 B1 | 7/2007 |
| WO | 2017174027 | 10/2017 |

\* cited by examiner

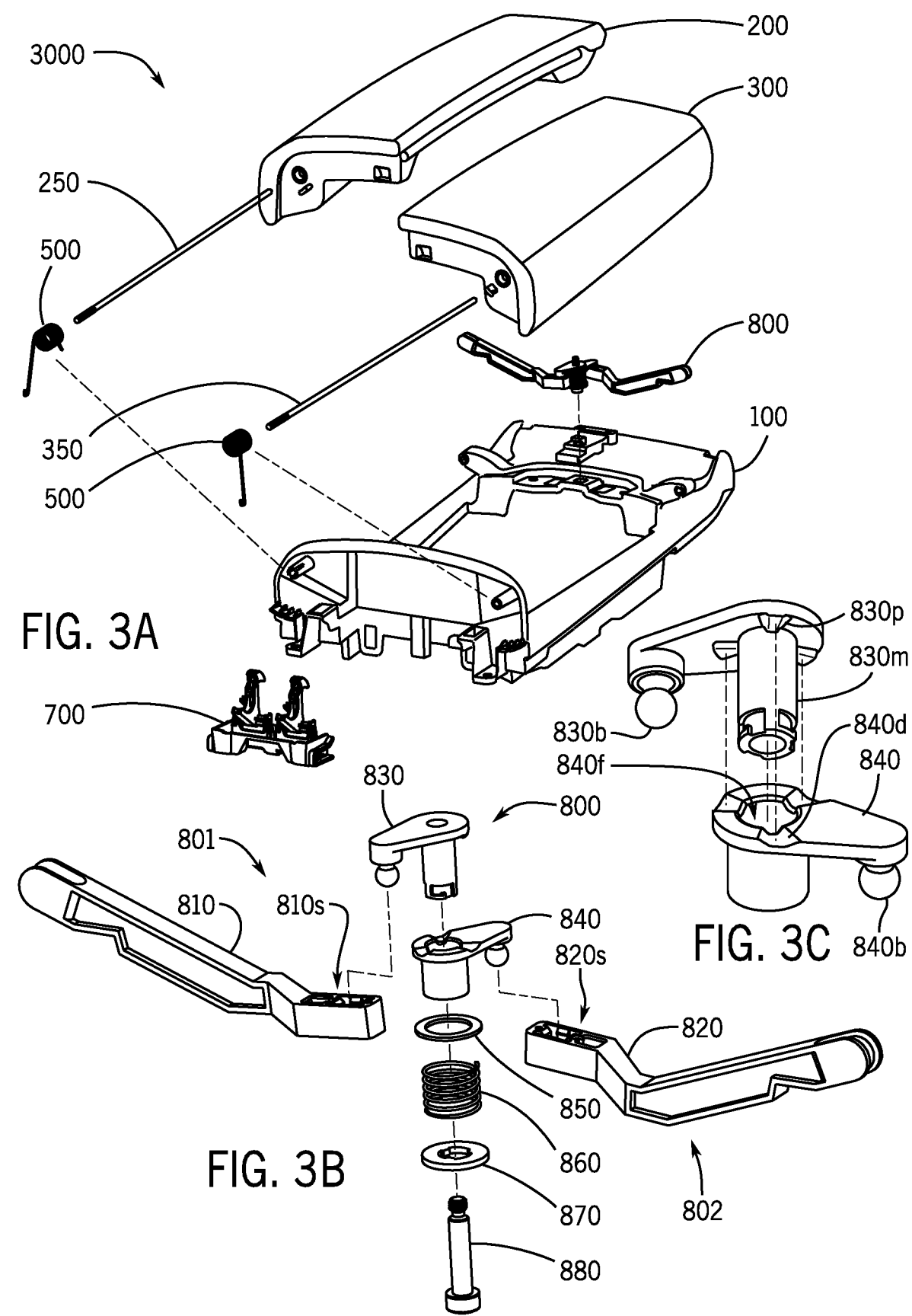

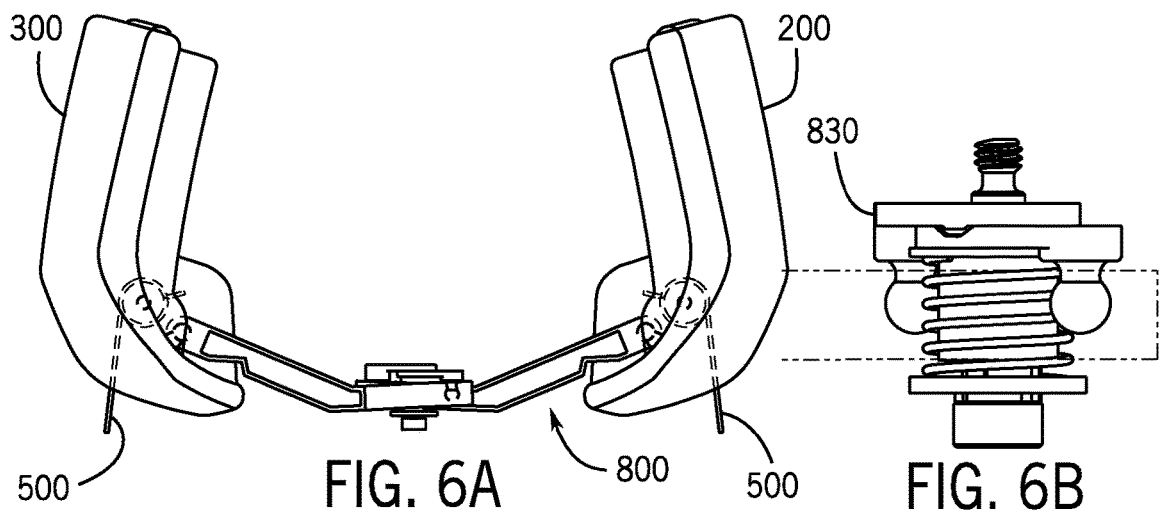
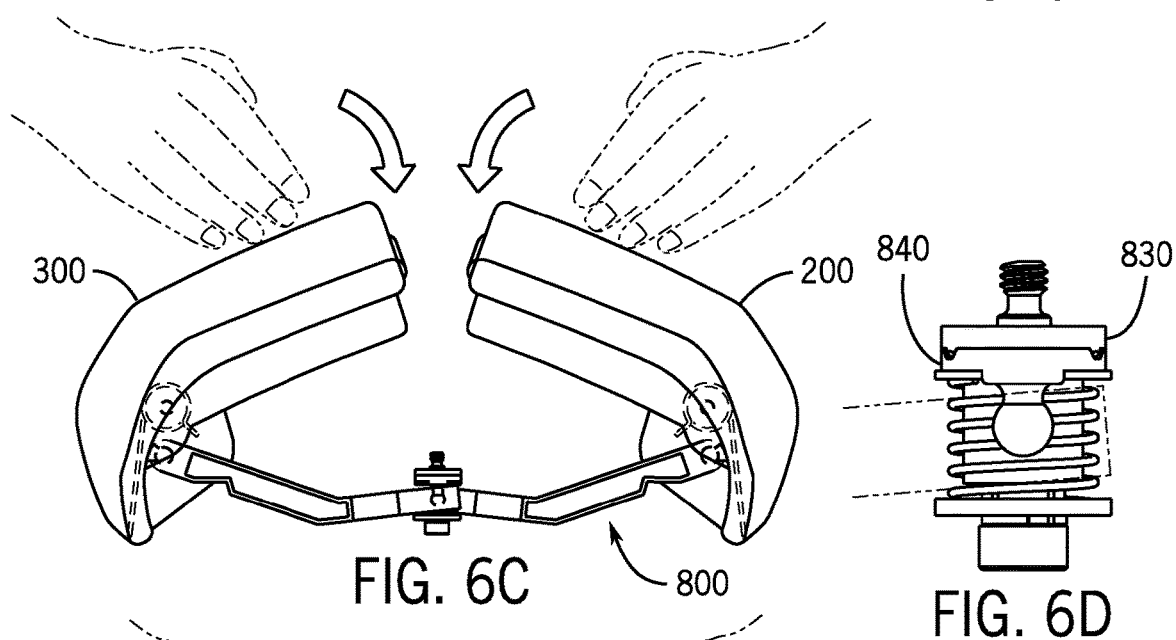
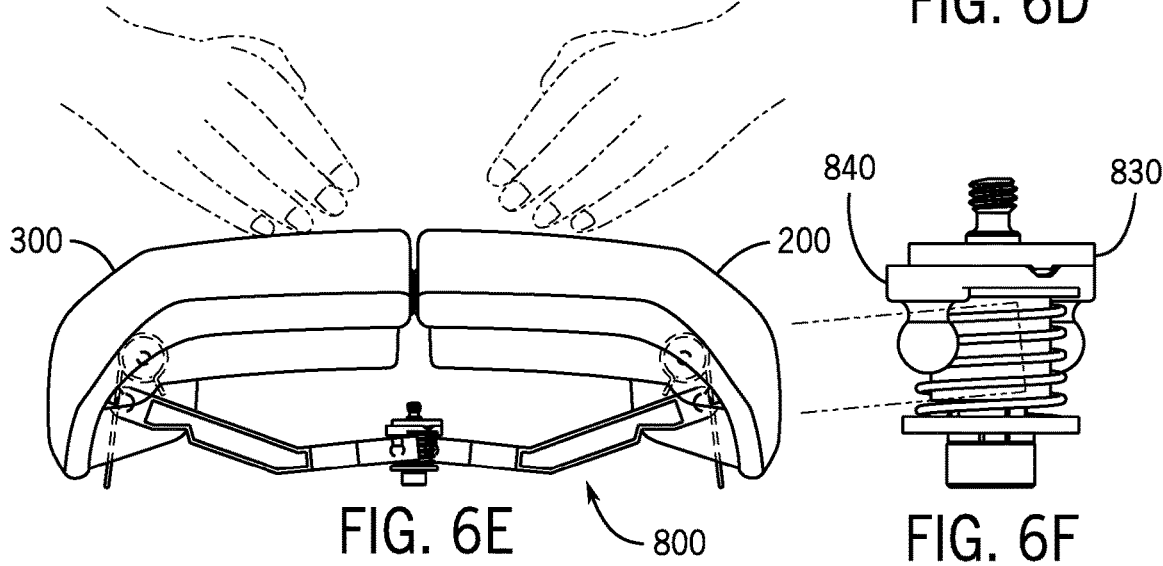

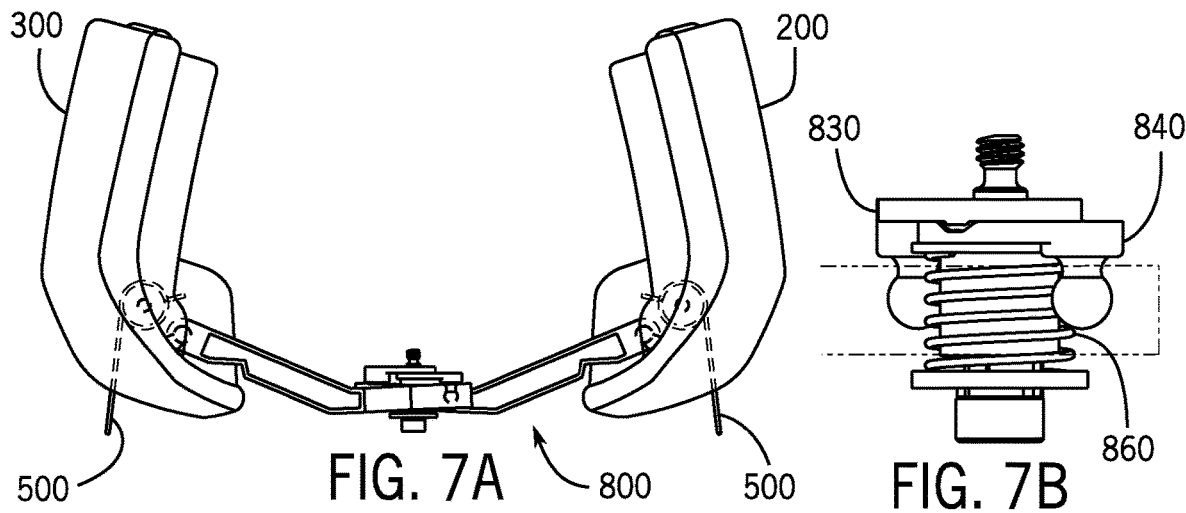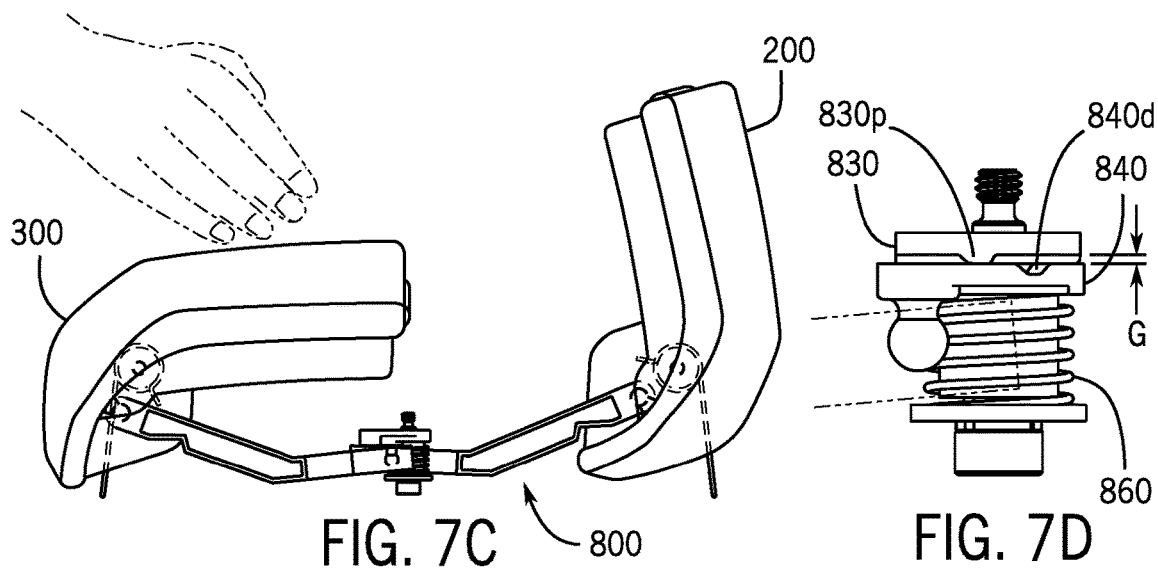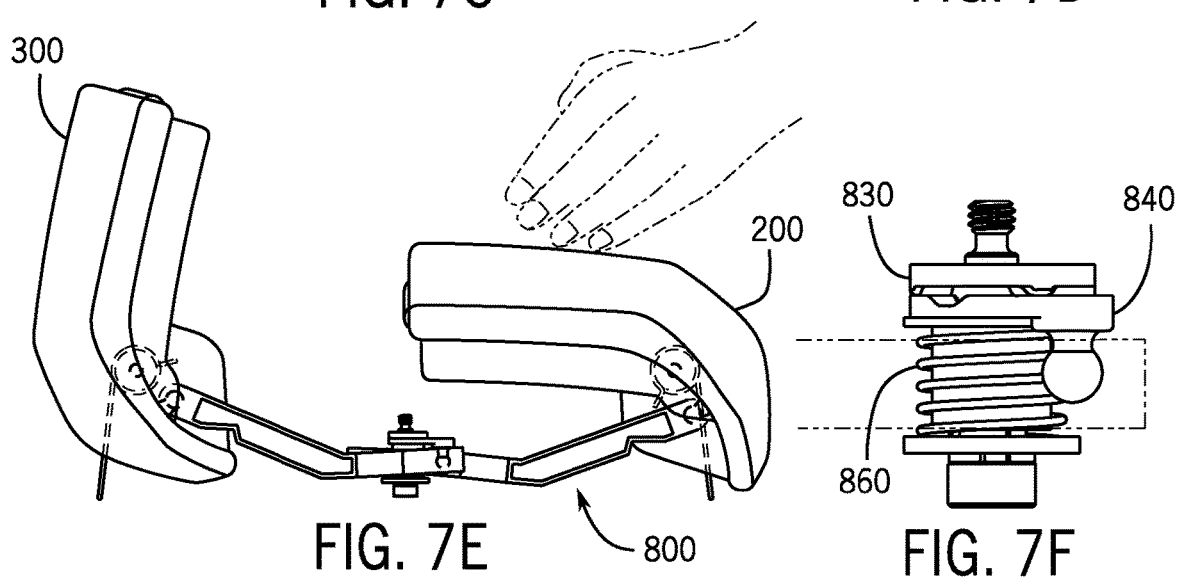

VEHICLE INTERIOR COMPONENT

CROSS-REFERENCE TO RELATED APPLICATIONS

The present application is a continuation of International/PCT Patent Application No. PCT/US19/47238 titled "VEHICLE INTERIOR COMPONENT" filed Aug. 20, 2019, which claims the benefit of U.S. Provisional Patent Application No. 62/720,921 titled "VEHICLE INTERIOR COMPONENT" filed Aug. 21, 2018.

The present application claims priority to and incorporates by reference in full the following patent applications: (a) U.S. Provisional Patent Application No. 62/720,921 titled "VEHICLE INTERIOR COMPONENT" filed Aug. 21, 2018; (b) International/PCT Patent Application No. PCT/US19/47238 titled "VEHICLE INTERIOR COMPONENT" filed Aug. 20, 2019.

FIELD

The present invention relates a vehicle interior component.

BACKGROUND

It is known to provide a vehicle interior component including a base, a first cover movable relative to the base between a closed position and an open position, and a second cover movable relative to the base between a closed position and an open position.

It would be advantageous to provide an improved vehicle interior component including a base, a first cover movable relative to the base between a closed position and an open position, a second cover movable relative to the base between a closed position and an open position and a link configured for a coupled state to couple movement of the covers and a decoupled state to de-couple movement of the covers.

SUMMARY

The present invention relates to a vehicle interior component comprising: a base providing a compartment; a first cover movable relative to the base between a closed position and an open position; a second cover movable relative to the base between a closed position and an open position; and a link coupled to the first cover and the second cover. The link may be configured to couple movement of the first cover and the second cover from the closed position to the open position; the link may be configured to decouple movement of the first cover and the second cover from the open position to the closed position. One of the first cover and the second cover may be configured to remain in the open position as the other of the first cover and the second cover moves from the open position to the closed position. The component may further comprise a spring configured to compress to enable the first cover and the second cover to move relative to one another. The spring may be configured to couple movement of the first cover and the second cover from the closed position to the open position. The spring may comprise a coil spring. The component may further comprise a spring; when the first cover is in the open position, the second cover is in the open position and an external force is applied to move the first cover from the open position toward the closed position, the spring may be configured to compress to maintain the second cover in the open position. The component may further comprise a spring configured to compress in response to movement of the first cover from the open position toward the closed position.

The present invention relates to a vehicle interior component comprising: a base providing a compartment; a first cover movable relative to the base between a closed position and an open position; a second cover movable relative to the base between a closed position and an open position; and a link coupled to the first cover and the second cover. The link may be configured for (a) a coupled state to couple movement of the first cover and the second cover and (b) a decoupled state to de-couple movement of the first cover and the second cover; the link may comprise a first arm and a second arm; one of the first arm and the second arm may comprise a depression and the other of the first arm and the second arm may comprise a protrusion; the protrusion may be configured to engage the depression to couple the first arm and the second arm. When an external force is applied to move the first cover from the open position toward the closed position, the first arm may be configured to rotate relative to the second arm to disengage the protrusion and the depression to enable the first arm to move relative to the second arm. The component may further comprise a spring; the spring may be configured to compress to disengage the protrusion and the depression to enable the first arm and the second arm to move relative to one another. The base may comprise a shaft; the link may be configured to (a) couple the first cover to the shaft and (b) couple the second cover to the shaft. The second arm may comprise a female feature; the first arm may comprise a male feature configured to rotate within the female feature of the second arm. The component may further comprise a spring configured to compress in response to movement of the first cover from the open position toward the closed position. The component may further comprise a spring; the spring may be configured to bias the first arm to engage the second arm.

The present invention relates to a vehicle interior component comprising: a base providing a compartment; a first cover movable relative to the base between a closed position and an open position; a second cover movable relative to the base between a closed position and an open position; a link coupled to the first cover and the second cover; and a shaft coupled to the base. The link may comprise a first arm and a second arm; one of the first arm and the second arm may be configured to rotate about the shaft and the other of the first arm and the second arm may be configured to be fixed to de-couple movement of the first cover and the second cover. The first arm may be coupled to the base at the shaft and the second arm may be coupled to the base at the shaft. The component may further comprise a spring; the spring may be configured to bias the first arm to engage the second arm. The link may be configured to (a) couple the first cover to the shaft and (b) couple the second cover to the shaft. The first arm may comprise a ball and socket joint. The component may comprise at least one of a console; a center console; a floor console.

The present invention relates to a vehicle interior component comprising a base providing a compartment, a first cover movable relative to the base between a closed position and an open position, a second cover movable relative to the base between a closed position and an open position and a link coupled to the first cover and the second cover. The link may be configured to couple movement of the first cover and the second cover from the closed position to the open position; the link may be configured to decouple movement of the first cover and the second cover from the open position to the closed position. One of the first cover and the second cover may be configured to remain in the open position as the other of the first cover and the second cover moves from the open position to the closed position. The component may comprise a spring configured to (a) couple movement of the first cover and the second cover from the closed position to the open position; and (b) compress to enable the first cover and the second cover to move relative to one another. The link may comprise a first arm and a second arm; the first arm may be configured to move relative to the second arm to enable one of the first cover and the second cover to remain in the open position as the other of the first cover and the second cover moves from the open position to the closed position. One of the first arm and the second arm may comprise a depression and the other of the first arm and the second arm may comprise a protrusion; the protrusion may be configured to engage the depression to couple the first arm and the second arm. The link may comprise a spring; the spring may be configured to compress to disengage the protrusion and the depression to enable the first arm and the second arm to move relative to one another. The second arm may comprise a female feature; the first arm may comprise a male feature configured to rotate within the female feature of the second arm. The first arm may comprise a ball and socket joint. The first arm may comprise a bar and a coupler; the second arm may comprise a bar and coupler coupled to the coupler of the first arm. The base may comprise a shaft; the link may be configured to couple the first cover to the shaft and couple the second cover to the shaft.

The present invention relates to a vehicle interior component comprising a base providing a compartment, a first cover movable relative to the base between a closed position and an open position, a second cover movable relative to the base between a closed position and an open position and a link coupled to the first cover and the second cover. The link may be configured for a coupled state to couple movement of the first cover and the second cover and a decoupled state to de-couple movement of the first cover and the second cover. The link may comprise a first arm and a second arm. The first arm may be coupled to the second arm to link movement of the first cover and the second cover. The first arm and the second arm may be configured to move relative to one another to de-couple movement of the first cover and the second cover. One of the first arm and the second arm may comprise a depression and the other of the first arm and the second arm may comprise a protrusion; the protrusion may be configured to engage the depression to couple the first arm and the second arm. The component may comprise a spring. When an external force is applied to move the first cover from the open position toward the closed position, the spring may be compressed to disengage the protrusion and the depression to enable the first arm and the second arm to move relative to one another.

The present invention relates to a vehicle interior component comprising a base providing a compartment, a first cover movable relative to the base between a closed position and an open position, a second cover movable relative to the base between a closed position and an open position, a link coupled to the first cover and the second cover and a shaft coupled to the base. The link may comprise a first arm and a second arm; the first arm may be coupled to the base at the shaft and the second arm may be coupled to the base at the shaft. The first arm may be configured to rotate about the shaft as the first cover moves between the closed position of the first cover and the open position of the first cover and the second arm may be configured to rotate about the shaft as the second cover moves between the closed position of the second cover and the open position of the second cover. The first arm may be configured to rotate with the second arm about the shaft as the first cover moves from the closed position of the first cover to the open position of the first cover and the second cover moves from the closed position of the second cover to the open position of the second cover. One of the first arm and the second arm may be configured to rotate about the shaft and the other of the first arm and the second arm may be fixed to de-couple movement of the first cover and the second cover. One of the first arm and the second arm may comprise a depression and the other of the first arm and the second arm may comprise a protrusion; the protrusion may be configured to engage the depression to couple the first arm and the second arm. When an external force is applied to move the first cover from the open position toward the closed position, the first arm may be configured to rotate relative to the second arm to disengage the protrusion and the depression to enable the first arm to move relative to the second arm. The component may comprise spring. The spring may be configured to bias the first arm to engage the second arm. The spring may be configured to compress as one of the first cover and the second cover moves from the open position to the closed position. The spring may be configured to compress to de-couple movement of the first arm and the second arm. The spring may be configured to couple movement of the first arm and the second arm as the first cover moves from the closed position of the first cover to the open position of the first cover and the second cover moves from the closed position of the second cover to the open position of the second cover.

The present invention relates to a vehicle interior component comprising a base providing a compartment; a first cover movable relative to the base between a closed position and an open position; a second cover movable relative to the base between a closed position and an open position; a link coupled to the first cover and the second cover; and a spring. The spring may be configured to bias the link to couple movement of the first cover and the second cover from the closed position to the open position. The spring may be configured to compress to enable one of the first cover and the second cover to remain in the open position as the other of the first cover and the second cover moves from the open position to the closed position. The link may comprise a first arm and a second arm; the spring may be configured to bias the second arm to engage the first arm. The spring may be configured compress in response to movement of the first cover from the open position toward the closed position.

FIGURES

FIGS. 3A-3C are schematic partial exploded perspective views of a vehicle interior component according to an exemplary embodiment.

FIGS. 6A-6F are schematic partial section views of a vehicle interior component according to an exemplary embodiment.

FIGS. 7A-7F are schematic partial section views of a vehicle interior component according to an exemplary embodiment.

DESCRIPTION

Figure 1A:
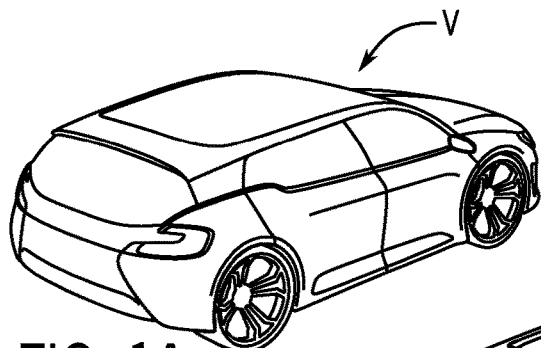
FIG. 1A is a schematic perspective view of a vehicle according to an exemplary embodiment.
Figure 1B:
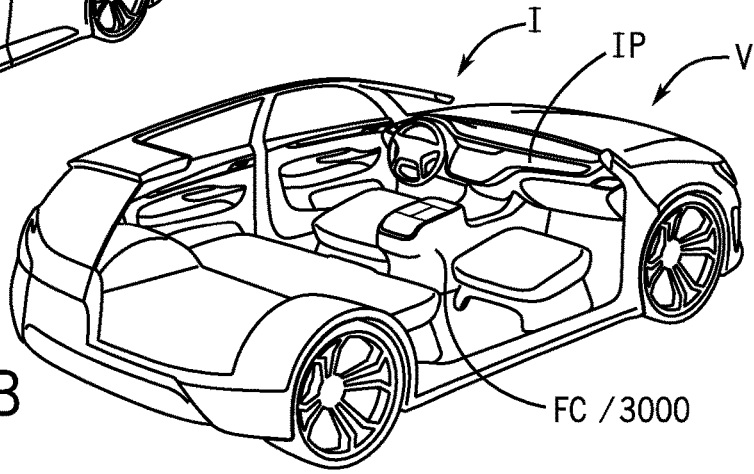
FIG. 1B is a schematic perspective view of a vehicle showing a vehicle interior according to an exemplary embodiment.

According to an exemplary embodiment as shown schematically in FIGS. 1A-1B, a vehicle V may comprise an interior I including an instrument panel IP and a floor console FC.

Figure 1C:
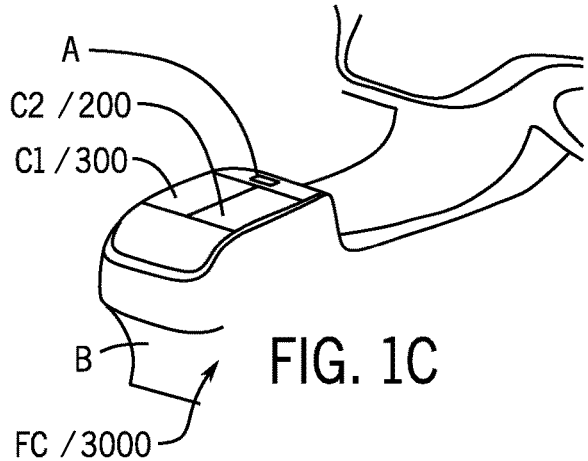
FIGS. 1C-1F are schematic perspective views of a vehicle interior component according to an exemplary embodiment.
Figure 1D:
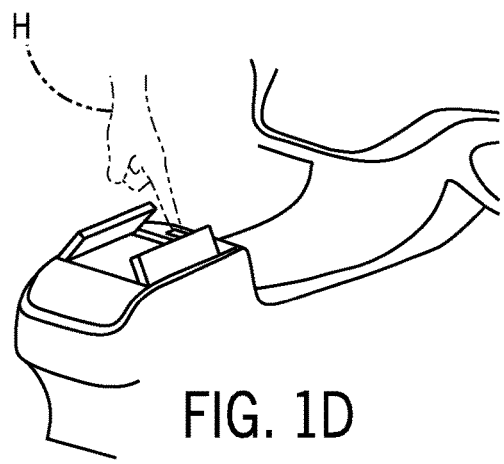
Figure 1E:
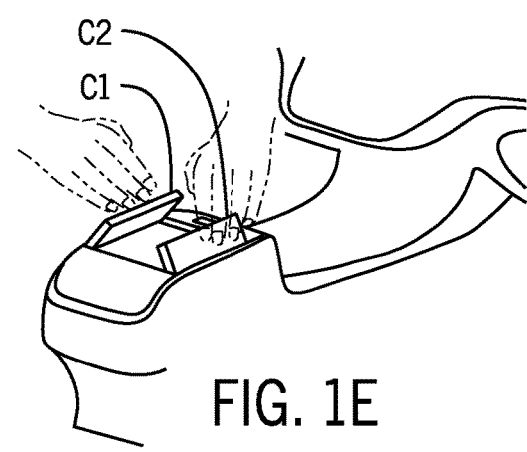
Figure 1F:
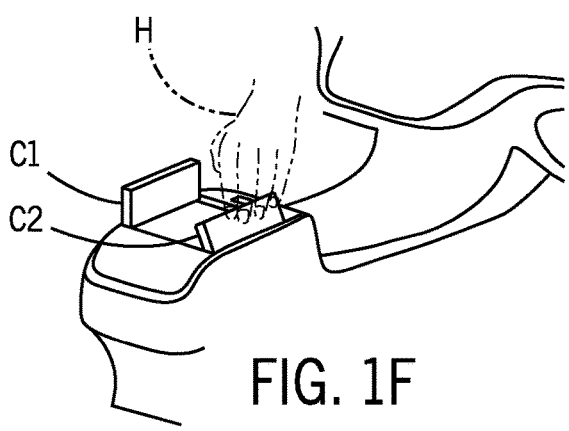
Figure 2A:
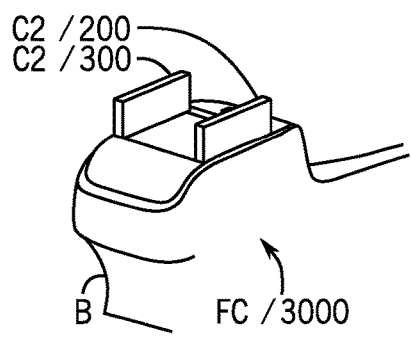
FIGS. 2A-2I are schematic perspective views of a vehicle interior component according to an exemplary embodiment.
Figure 2B:
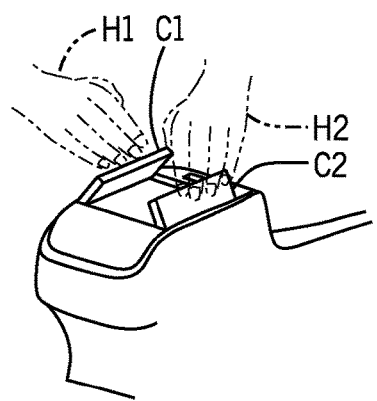
Figure 2C:
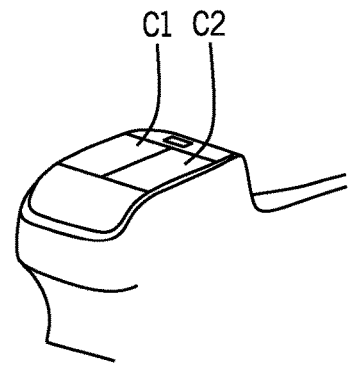
Figure 2D:
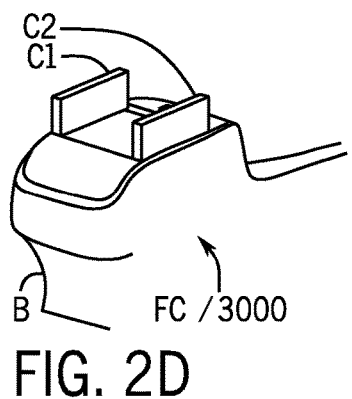
Figure 2E:
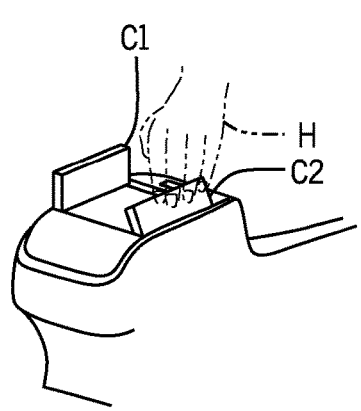
Figure 2F:
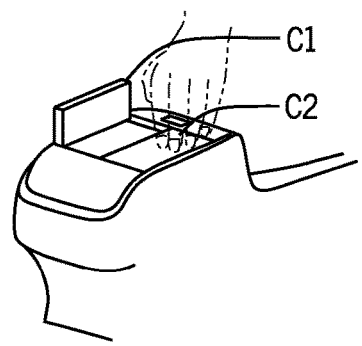
Figure 2G:
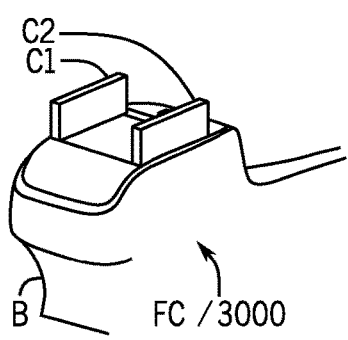
Figure 2H:
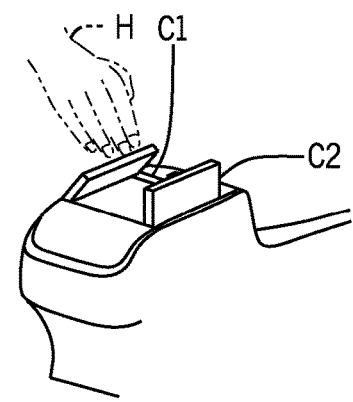
Figure 2I:
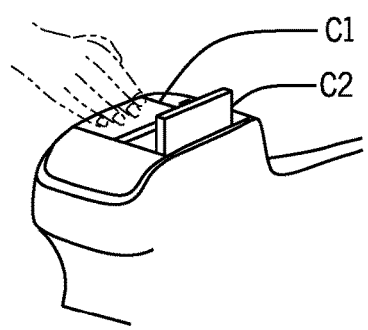

According to an exemplary embodiment as shown in FIGS. 1C-1F and 2A-2I, vehicle interior component 3000 shown as a floor console FC may comprise a base B, a first cover C1/300 and a second cover C2/200. Vehicle interior component 3000/FC may be configured to be operated by application of an external force from an occupant shown as a hand H/H1/H2. Base B may provide a compartment. First cover C1/300 may be movable relative to base B between a closed position as shown schematically in FIGS. 1C and 2C and 2I to at least partially cover the compartment and an open position as shown schematically in FIGS. 1F, 2A and 2D-2G to uncover the compartment. Second cover C2/200 may be movable relative to base B between a closed position as shown schematically in FIGS. 1C, 2C and 2F to at least partially cover the compartment and an open position as shown schematically in FIGS. 2A, 2D and 2G-2I. First cover C1/300 and second cover C2/200 may be configured for movement between (a) a first state with first cover C1/300 in the open position of first cover C1/300 and second cover C2/200 in the open position of second cover C2/200 as shown schematically in FIGS. 2A, 2D and 2G; (b) a second state with first cover C1/300 in the closed position of first cover C1/300 and second cover C2/200 in the open position of second cover C2/200 as shown schematically in FIG. 2I; (c) a third state with first cover C1/300 in the open position of first cover C1/300 and second cover C2/200 in the closed position of second cover C2/200 as shown schematically in FIG. 2F; (d) a fourth state with first cover C1 in the closed position of first cover C1/300 and second cover C2/200 in the closed position of second cover C2/200 as shown schematically in FIGS. 1C and 2C. First cover C1/300 may be configured to remain in the open position as second cover C2/200 moves from the open position to the closed position as shown schematically in FIGS. 1F, 2D-2F. Second cover C2/200 may be configured to remain in the open position as first cover C1/300 moves from the open position to the closed position as shown schematically in FIGS. 2G-2I. Vehicle interior component FC may be configured for (a) a coupled state to couple movement of first cover C1/300 and second cover C2/200 as shown schematically in FIGS. 1C-1D and (b) a decoupled state to de-couple movement of first cover C1/300 and second cover C2/200 as shown schematically in FIGS. 1E, 1F, 2A-2I.

Figure 4A:
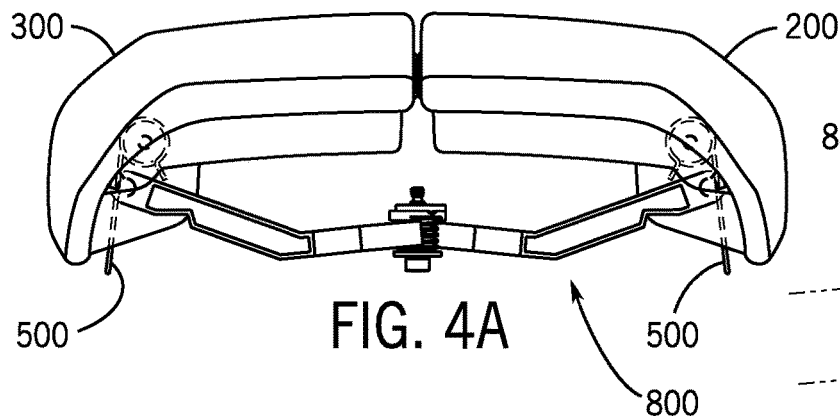
FIGS. 4A-4F are schematic partial section views of a vehicle interior component according to an exemplary embodiment.
Figure 4B:
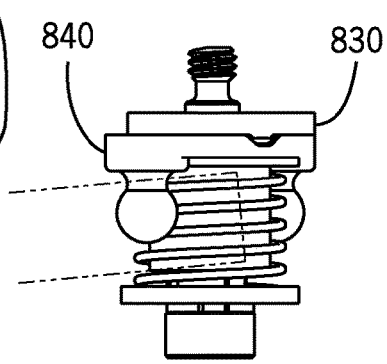
Figure 4C:
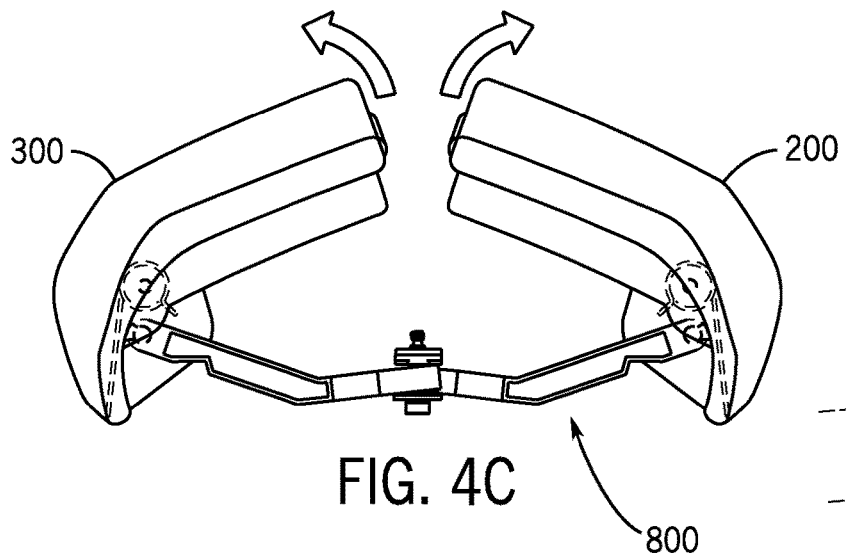
Figure 4D:
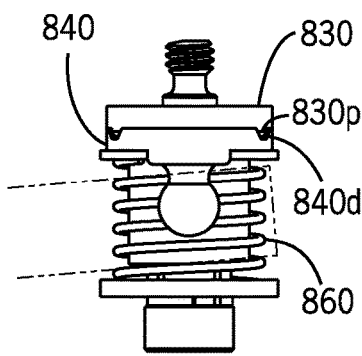
Figure 4E:
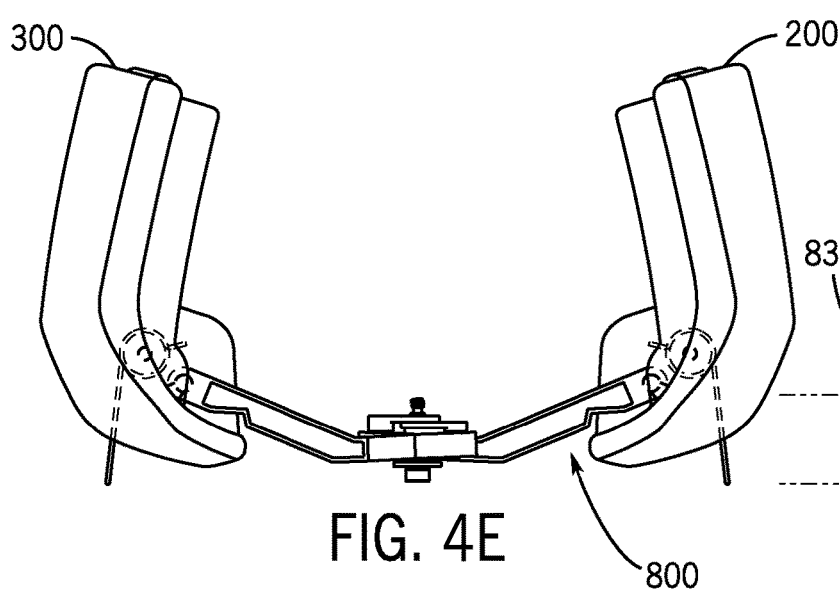
Figure 4F:
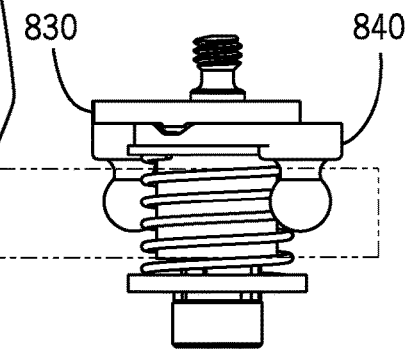
Figure 5A:
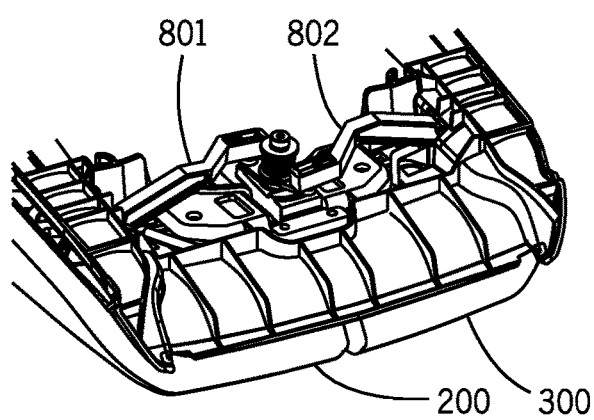
FIGS. 5A-5F are schematic partial perspective views of a vehicle interior component according to an exemplary embodiment.
Figure 5B:
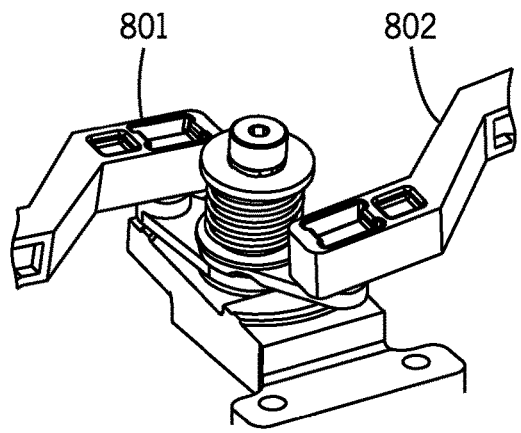
Figure 5C:
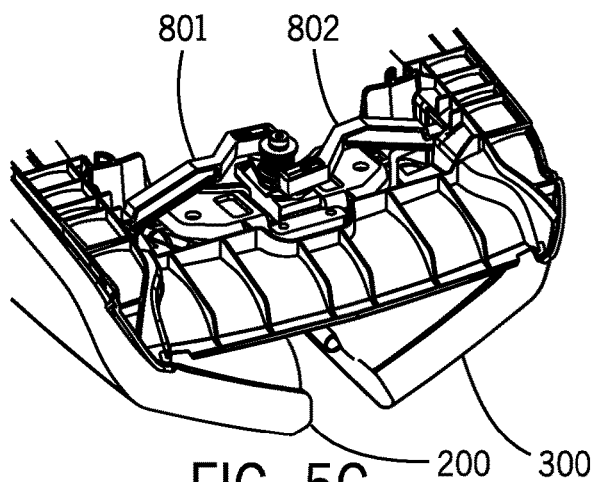
Figure 5D:
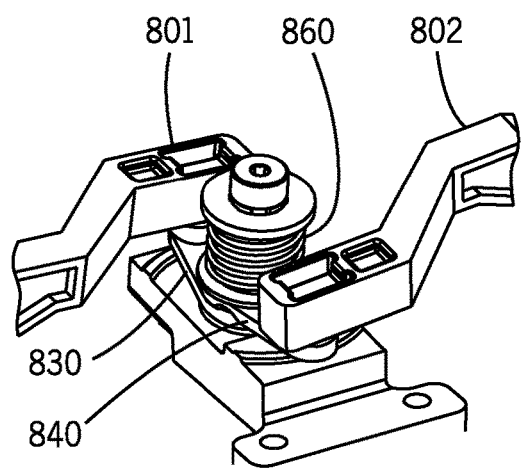
Figure 5E:
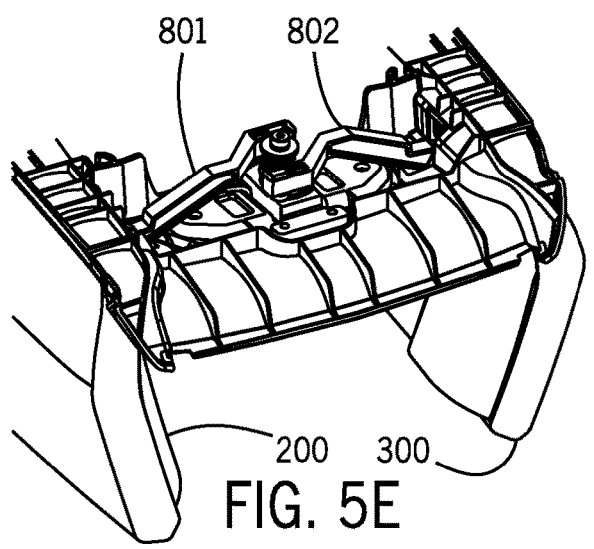
Figure 5F:
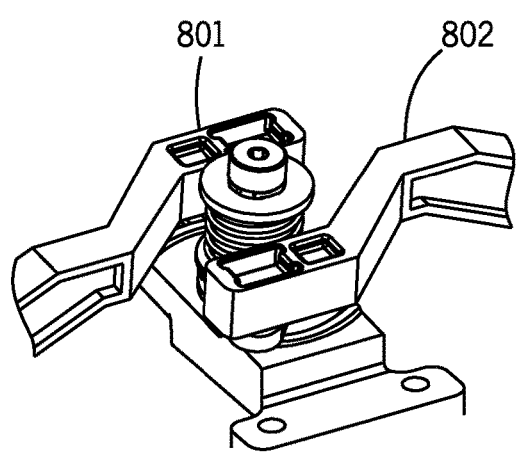
Figure 8A:
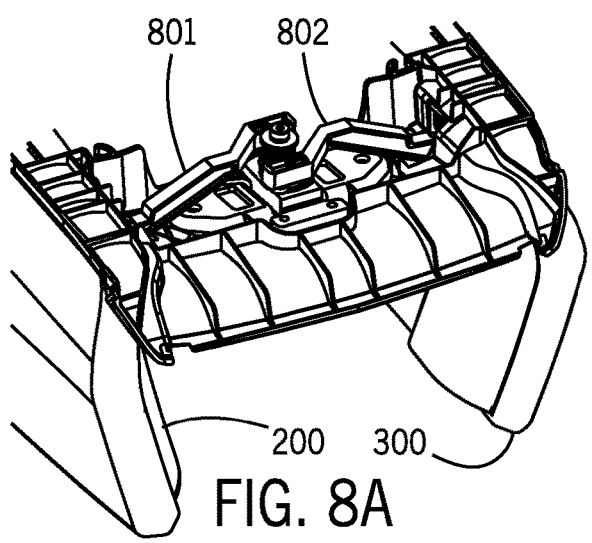
FIGS. 8A-8F are schematic partial perspective views of a vehicle interior component according to an exemplary embodiment.
Figure 8B:
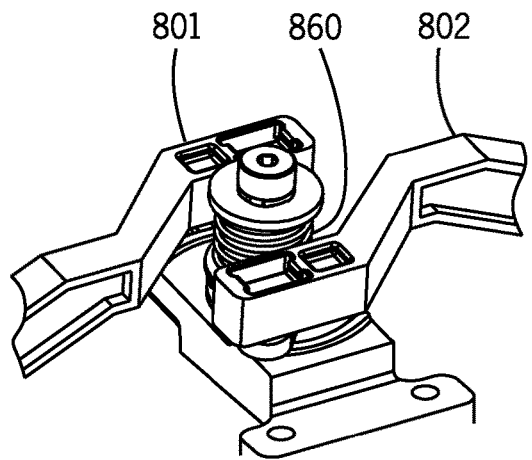
Figure 8C:
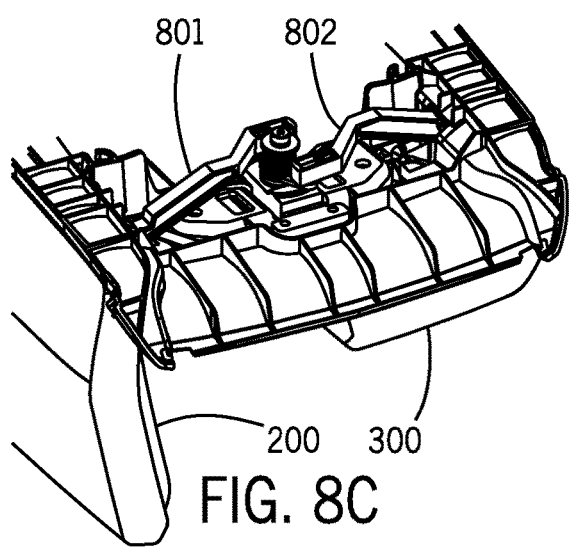
Figure 8D:
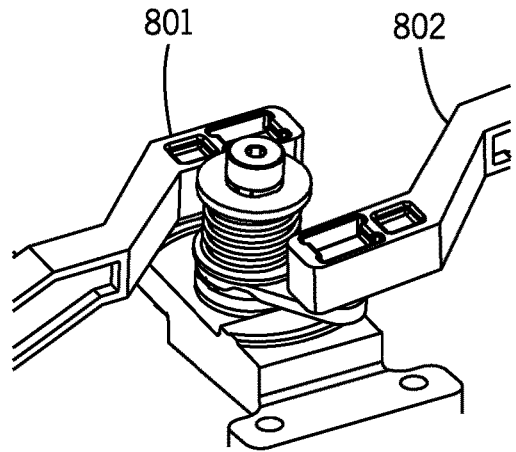
Figure 8E:
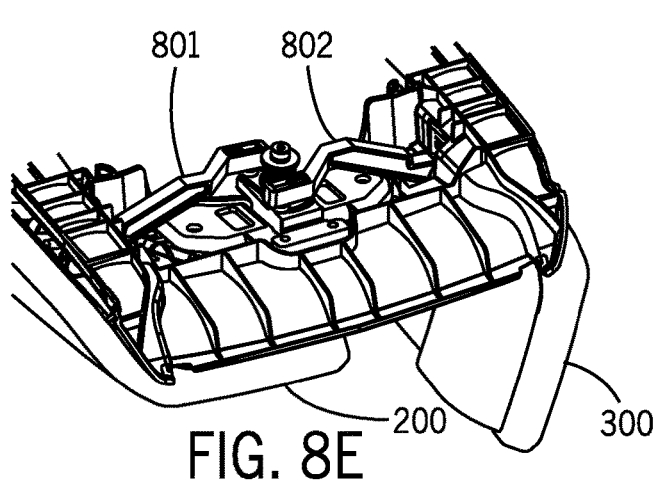
Figure 8F:
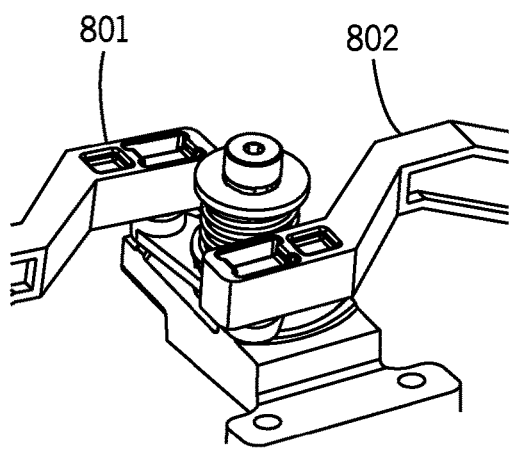
Figure 9A:
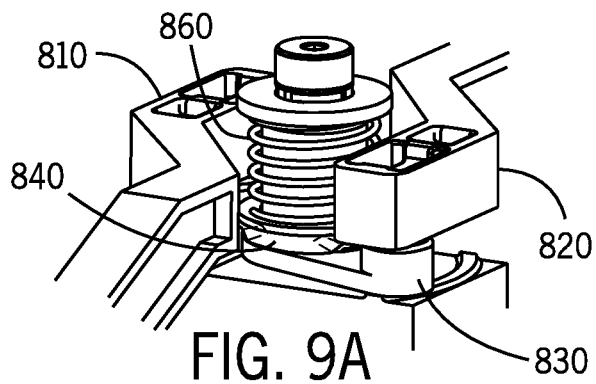
FIG. 9A is a schematic partial perspective views of a vehicle interior component according to an exemplary embodiment.
Figure 9B:
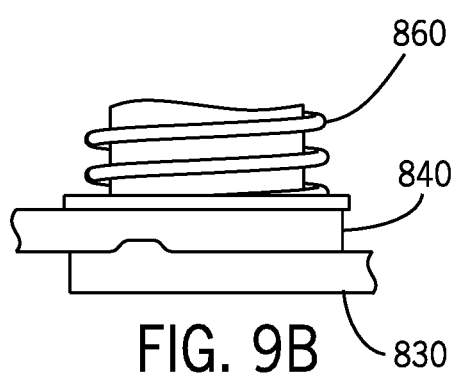
FIG. 9B is a schematic partial section view of a vehicle interior component according to an exemplary embodiment.
Figure 9C:
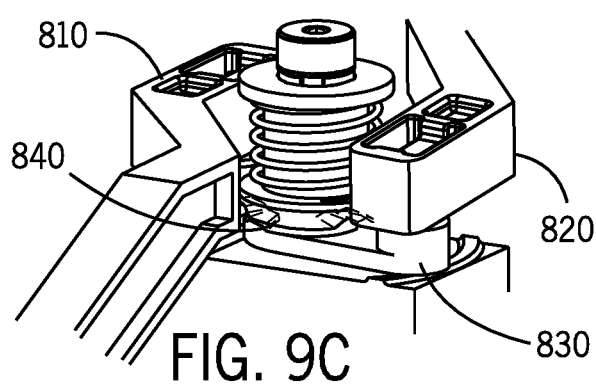
FIG. 9C is a schematic partial perspective views of a vehicle interior component according to an exemplary embodiment.
Figure 9D:
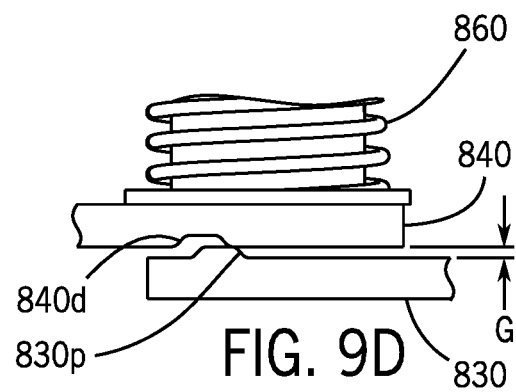
FIG. 9D is a schematic partial section view of a vehicle interior component according to an exemplary embodiment.
Figure 9E:
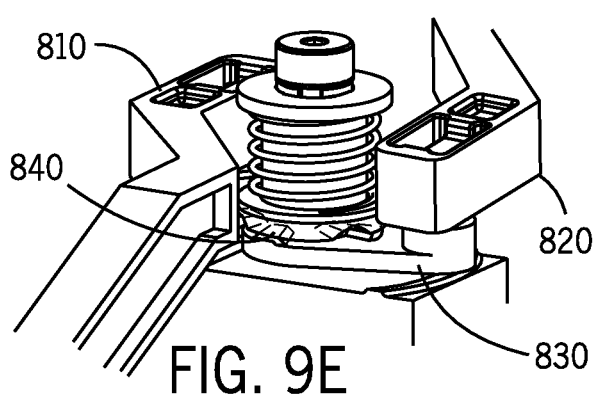
FIG. 9E is a schematic partial perspective views of a vehicle interior component according to an exemplary embodiment.
Figure 9F:
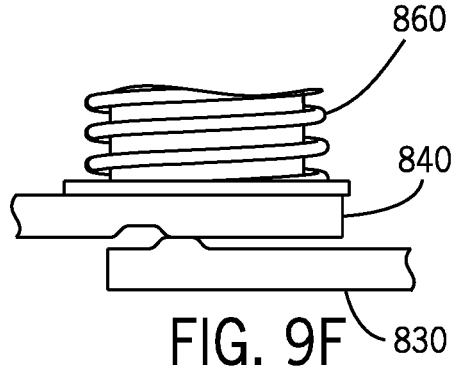
FIG. 9F is a schematic partial section view of a vehicle interior component according to an exemplary embodiment.
Figure 9G:
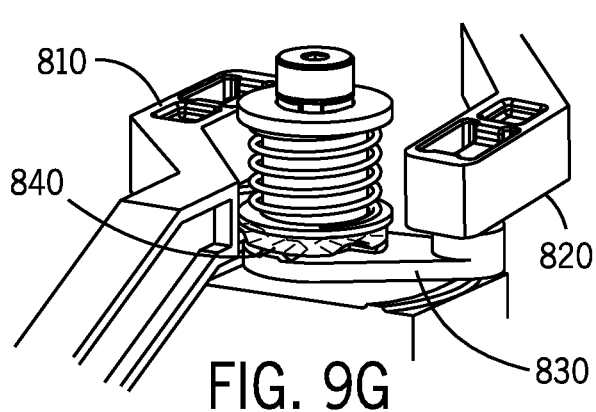
FIG. 9G is a schematic partial perspective views of a vehicle interior component according to an exemplary embodiment.
Figure 9H:
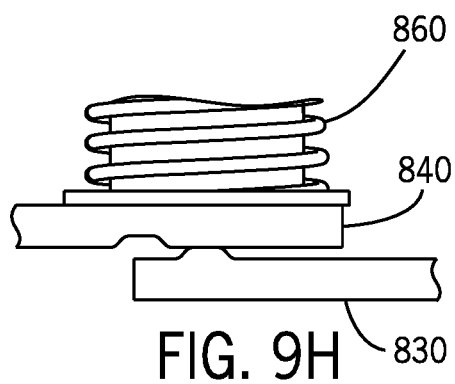
FIG. 9H is a schematic partial section view of a vehicle interior component according to an exemplary embodiment.

According to an exemplary embodiment as shown schematically in FIG. 3A, vehicle interior component 3000 may comprise a base 100, a first cover 200 and a second cover 300. According to an exemplary embodiment, vehicle interior component 3000 may comprise a link 800. According to an exemplary embodiment, vehicle interior component 3000 may comprise a set of springs 500, an actuator or button and a latch 700. Set of springs 500 may be configured to move first cover 200 and second cover 300 relative to base 100 between a closed position as shown schematically in FIG. 4A to at least partially cover the compartment and an open position as shown schematically in FIG. 4E to uncover the compartment. A button may be configured to actuate latch 700 to move first cover 200 and second cover 300 relative to base 100 between a closed position as shown schematically in FIG. 4A to at least partially cover the compartment and an open position as shown schematically in FIG. 4E to uncover the compartment.

According to an exemplary embodiment as shown schematically in FIGS. 3B and 3C, link 800 may comprise a first arm 801, a second arm 802, a spring 860 and a shaft 880. Link 800 may comprise a washer 850 and a washer 870. First arm 801 may comprise a protrusion or set of protrusions 830p. Second arm 802 may comprise a depression or set of depressions 840d. Second arm 802 may comprise a female feature 840f; first arm 801 may comprise a male feature 830m configured to rotate within female feature 840f of second arm 802. First arm 801 may comprise a ball and socket joint comprising ball 830b and 810s. Second arm 802 may comprise a ball and socket joint comprising ball 840b and 820s. First arm 801 may comprise a bar 810 and a coupler 830; second arm 802 may comprise a bar 820 and coupler 840 coupled to coupler 830 of first arm 801. Base 100 may comprise a shaft 880; link 800 may be configured to couple first cover 200 to shaft 880 and couple second cover 300 to shaft 880.

According to an exemplary embodiment as shown schematically in FIGS. 3A-3C, 4A-4F, 5A-5F, 6A-6F, 7A-7F, 8A-8F and 9A-9H, a vehicle interior component 3000 may comprise a base 100 providing a compartment, a first cover 200 movable relative to base 100 between a closed position (see FIGS. 4A, 5A, 6E, 7E and 8E) and an open position (see FIGS. 4E, 5E, 6A, 7A, 7C, 8A and 8C), a second cover 300 movable relative to base 100 between a closed position (see FIGS. 4A, 5A, 6E, 7C and 8C) and an open position (see FIGS. 4E, 5E, 6A, 7A, 7E, 8A and 8E) and a link 800 coupled to first cover 200 and second cover 300. Link 800 may be configured to couple movement of first cover 200 and second cover 300 from the closed position to the open position (see FIGS. 4A-4F and 5A-5F); link 800 may be configured to decouple movement of first cover 200 and second cover 300 from the open position to the closed position (see FIGS. 7A-7F, 8A-8F and 9A-9H). One of first cover 200 and second cover 300 may be configured to remain in the open position as the other of first cover 200 and second cover 300 moves from the open position to the closed position (see FIGS. 7A-7F, 8A-8F and 9A-9H). Component 3000 may comprise a spring 860 configured to (a) couple movement of first cover 200 and second cover 300 from the closed position to the open position; and (b) compress to enable first cover 200 and second cover 300 to move relative to one another. Link 800 may comprise a first arm 801 and a second arm 802; first arm 801 may be configured to move relative to second arm 802 to enable one of first cover 200 and second cover 300 to remain in the open position as the other of first cover 200 and second cover 300 moves from the open position to the closed position (see FIGS. 7A-7F, 8A-8F and 9A-9H). One of first arm 801 and second arm 802 may comprise a depression 840d and the other of first arm 801 and second arm 802 may comprise a protrusion 830p; protrusion 830p may be configured to engage depression 840d to couple first arm 801 and second arm 802 (see FIGS. 4B, 4D, 4F, 6B, 6D and 6F). Link 800 may comprise a spring 860; spring 860 may be configured to compress to disengage protrusion 830p and depression 840d to enable first arm 801 and second arm 802 to move relative to one another (see FIGS. 7B, 7D and 7F). Second arm 802 may comprise a female feature 840f; first arm 801 may comprise a male feature 830m configured to rotate within female feature 840f of second arm 802 (see FIGS. 7B, 7D and 7F). First arm 801 may comprise a ball and socket joint comprising ball 830b and 810s. Second arm 802 may comprise a ball and socket joint comprising ball 840b and 820s. First arm 801 may comprise a bar 810 and a coupler 830; second arm 802 may comprise a bar 820 and coupler 840 coupled to coupler 830 of first arm 801. Base 100 may comprise a shaft 880; link 800 may be configured to couple first cover 200 to shaft 880 and couple second cover 300 to shaft 880.

According to an exemplary embodiment as shown schematically in FIGS. 3A-3C, 4A-4F, 5A-5F, 6A-6F, 7A-7F, 8A-8F and 9A-9H, a vehicle interior component 3000 may comprise a base 100 providing a compartment, a first cover 200 movable relative to base 100 between a closed position (see FIGS. 4A, 5A, 6E, 7E and 8E) and an open position (see FIGS. 4E, 5E, 6A, 7A, 7C, 8A and 8C), a second cover 300 movable relative to base 100 between a closed position (see FIGS. 4A, 5A, 6E, 7C and 8C) and an open position (see FIGS. 4E, 5E, 6A, 7A, 7E, 8A and 8E) and a link 800 coupled to first cover 200 and second cover 300. Link 800 may be configured for a coupled state to couple movement of first cover 200 and second cover 300 (see FIGS. 4A-4F and 5A-5F) and a decoupled state to de-couple movement of first cover 200 and second cover 300 (see FIGS. 7A-7F, 8A-8F and 9A-9H). Link 800 may comprise a first arm 801 and a second arm 802. First arm 801 may be coupled to second arm 802 to link movement of first cover 200 and second cover 300 (see FIGS. 4B, 4D, 4F, 6B, 6D and 6F). First arm 801 and second arm 802 may be configured to move relative to one another to de-couple movement of first cover 200 and second cover 300 (see FIGS. 7B, 7D and 7F). One of first arm 801 and second arm 802 may comprise a depression 840d and the other of first arm 801 and second arm 802 may comprise a protrusion 830p; protrusion 830p may be configured to engage depression 840d to couple first arm 801 and second arm 802 (see FIGS. 4B, 4D, 4F, 6B, 6D and 6F). Component 3000 may comprise a spring 860. When an external force is applied to move first cover 200 from the open position toward the closed position, spring 860 may be compressed to disengage protrusion 830p and depression 840d to enable first arm 801 and second arm 802 to move relative to one another (see FIGS. 7B, 7D and 7F).

According to an exemplary embodiment as shown schematically in FIGS. 3A-3C, 4A-4F, 5A-5F, 6A-6F, 7A-7F, 8A-8F and 9A-9H, a vehicle interior component 3000 may comprise a base 100 providing a compartment, a first cover 200 movable relative to base 100 between a closed position (see FIGS. 4A, 5A, 6E, 7E and 8E) and an open position (see FIGS. 4E, 5E, 6A, 7A, 7C, 8A and 8C), a second cover 300 movable relative to base 100 between a closed position (see FIGS. 4A, 5A, 6E, 7C and 8C) and an open position (see FIGS. 4E, 5E, 6A, 7A, 7E, 8A and 8E), a link 800 coupled to first cover 200 and second cover 300 and a shaft 880 coupled to base 100. Link 800 may comprise a first arm 801 and a second arm 802; first arm 801 may be coupled to base 100 at shaft 880 and second arm 802 may be coupled to base 100 at shaft 880 (see FIG. 3A). First arm 801 may be configured to rotate about shaft 880 as first cover 200 moves between the closed position of first cover 200 and the open position of first cover 200 and second arm 802 may be configured to rotate about shaft 880 as second cover 300 moves between the closed position of second cover 300 and the open position of second cover 300 (see FIGS. 4A-4F and 5A-5F). First arm 801 may be configured to rotate with second arm 802 about shaft 880 as first cover 200 moves from the closed position of first cover 200 to the open position of first cover 200 and second cover 300 moves from the closed position of second cover 300 to the open position of second cover 300 (see FIGS. 4A-4F and 5A-5F). One of first arm 801 and second arm 802 may be configured to rotate about shaft 880 and the other of first arm 801 and second arm 802 may be fixed to de-couple movement of first cover 200 and second cover 300 (see FIGS. 7A-7F, 8A-8F and 9A-9H). One of first arm 801 and second arm 802 may comprise a depression 840d and the other of first arm 801 and second arm 802 may comprise a protrusion 830p; protrusion 830p may be configured to engage depression 840d to couple first arm 801 and second arm 802 (see FIGS. 4B, 4D, 4F, 6B, 6D and 6F). When an external force is applied to move first cover 200 from the open position toward the closed position, first arm 801 may be configured to rotate relative to second arm 802 to disengage protrusion 830p and depression 840d to enable first arm 801 to move relative to second arm 802 (see FIGS. 7B, 7D, 7F, 9B, 9D, 9F and 9H). Component 3000 may comprise a spring 860. Spring 860 may be configured to bias first arm 801 to engage second arm 802 (see FIGS. 4B, 4D, 4F, 6B, 6D and 6F). Spring 860 may be configured to compress as one of first cover 200 and second cover 300 moves from the open position to the closed position (see FIGS. 7B, 7D and 7F). Spring 860 may be configured to compress to de-couple movement of first arm 801 and second arm 802 (see FIGS. 7B, 7D and 7F). Spring 860 may be configured to couple movement of first arm 801 and second arm 802 as first cover 200 moves from the closed position of first cover 200 to the open position of first cover 200 and second cover 300 moves from the closed position of second cover 300 to the open position of second cover 300 (see FIGS. 4B, 4D and 4F).

According to an exemplary embodiment as shown schematically in FIGS. 3A-3C, 4A-4F, 5A-5F, 6A-6F, 7A-7F, 8A-8F and 9A-9H, a vehicle interior component 3000 may comprise a base 100 providing a compartment, a first cover 200 movable relative to base 100 between a closed position (see FIGS. 4A, 5A, 6E, 7E and 8E) and an open position (see FIGS. 4E, 5E, 6A, 7A, 7C, 8A and 8C), a second cover 300 movable relative to base 100 between a closed position (see FIGS. 4A, 5A, 6E, 7C and 8C) and an open position (see FIGS. 4E, 5E, 6A, 7A, 7E, 8A and 8E), a link 800 coupled to first cover 200 and second cover 300, and a spring 860. Spring 860 may be configured to bias link 800 to couple movement of first cover 200 and second cover 300 from the closed position to the open position (see FIGS. 4B, 4D, 4F, 5B, 5D and 5F). Spring 860 may be configured to compress to enable one of first cover 200 and second cover 300 to remain in the open position as the other of first cover 200 and second cover 300 moves from the open position to the closed position (see FIGS. 7B, 7D and 7F). Link 800 may comprise a first arm 801 and a second arm 802; spring 860 may be configured to bias second arm 802 to engage first arm 801 (see FIGS. 4B, 4D, 4F, 5B, 5D and 5F). Spring 860 may be configured compress in response to movement of first cover 200 from the open position toward the closed position (see FIGS. 7B, 7D and 7F).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component comprising:
   (a) a base providing a compartment;
   (b) a first cover movable relative to the base between a closed position and an open position;
   (c) a second cover movable relative to the base between a closed position and an open position; and
   (d) a link coupled to the first cover and the second cover; wherein the link is configured to couple movement of the first cover and the second cover from the closed position to the open position; and
   wherein the link is configured to decouple movement of the first cover and the second cover from the open position to the closed position.

2. The component of claim 1 wherein one of the first cover and the second cover is configured to remain in the open position as the other of the first cover and the second cover moves from the open position to the closed position.

3. The component of claim 1 further comprising a spring configured to compress to enable the first cover and the second cover to move relative to one another.

4. The component of claim 3 wherein the spring is configured to couple movement of the first cover and the second cover from the closed position to the open position.

5. The component of claim 3 wherein the spring comprises a coil spring.

6. The component of claim 1 further comprising a spring; wherein when the first cover is in the open position, the second cover is in the open position and an external force is applied to move the first cover from the open position toward the closed position, the spring is configured to compress to maintain the second cover in the open position.

7. The component of claim 1 further comprising a spring configured to compress in response to movement of the first cover from the open position toward the closed position.

8. A vehicle interior component comprising:
   (a) a base providing a compartment;
   (b) a first cover movable relative to the base between a closed position and an open position;
   (c) a second cover movable relative to the base between a closed position and an open position; and
   (d) a link coupled to the first cover and the second cover; wherein the link is configured for (a) a coupled state to couple movement of the first cover and the second cover and (b) a decoupled state to de-couple movement of the first cover and the second cover;
   wherein the link comprises a first arm and a second arm;
   wherein one of the first arm and the second arm comprises a depression and the other of the first arm and the second arm comprises a protrusion; wherein the protrusion is configured to engage the depression to couple the first arm and the second arm.

9. The component of claim 8 wherein when an external force is applied to move the first cover from the open position toward the closed position, the first arm is configured to rotate relative to the second arm to disengage the protrusion and the depression to enable the first arm to move relative to the second arm.

10. The component of claim 8 further comprising a spring; wherein the spring is configured to compress to disengage the protrusion and the depression to enable the first arm and the second arm to move relative to one another.

11. The component of claim 8 wherein the base comprises a shaft; wherein the link is configured to (a) couple the first cover to the shaft and (b) couple the second cover to the shaft.

12. The component of claim 8 wherein the second arm comprises a female feature; wherein the first arm comprises a male feature configured to rotate within the female feature of the second arm.

13. The component of claim 8 further comprising a spring configured to compress in response to movement of the first cover from the open position toward the closed position.

14. The component of claim 8 further comprising a spring; wherein the spring is configured to bias the first arm to engage the second arm.

15. A vehicle interior component comprising:
(a) a base providing a compartment;
(b) a first cover movable relative to the base between a closed position and an open position;
(c) a second cover movable relative to the base between a closed position and an open position;
(d) a link coupled to the first cover and the second cover; and
(e) a shaft coupled to the base;
wherein the link comprises a first arm and a second arm;
wherein one of the first arm and the second arm is configured to rotate about the shaft and the other of the first arm and the second arm is configured to be fixed to de-couple movement of the first cover and the second cover.

16. The component of claim 15 wherein the first arm is coupled to the base at the shaft and the second arm is coupled to the base at the shaft.

17. The component of claim 15 further comprising a spring; wherein the spring is configured to bias the first arm to engage the second arm.

18. The component of claim 15 wherein the link is configured to (a) couple the first cover to the shaft and (b) couple the second cover to the shaft.

19. The component of claim 15 wherein the first arm comprises a ball and socket joint.

20. The component of claim 15 comprising at least one of a console; a center console; a floor console.

\* \* \* \* \*